3,277,476
SIMULATED DOPPLER TARGET
Robert J. Sabin, Mesilla Park, and Jose I. Rivera, Jr., and Leon E. Tatreault, Las Cruces, N. Mex., assignors, by mesne assignments, to the United States of America as represented by the Secretary of the Navy
Filed Apr. 23, 1964, Ser. No. 363,677
21 Claims. (Cl. 343—17.7)

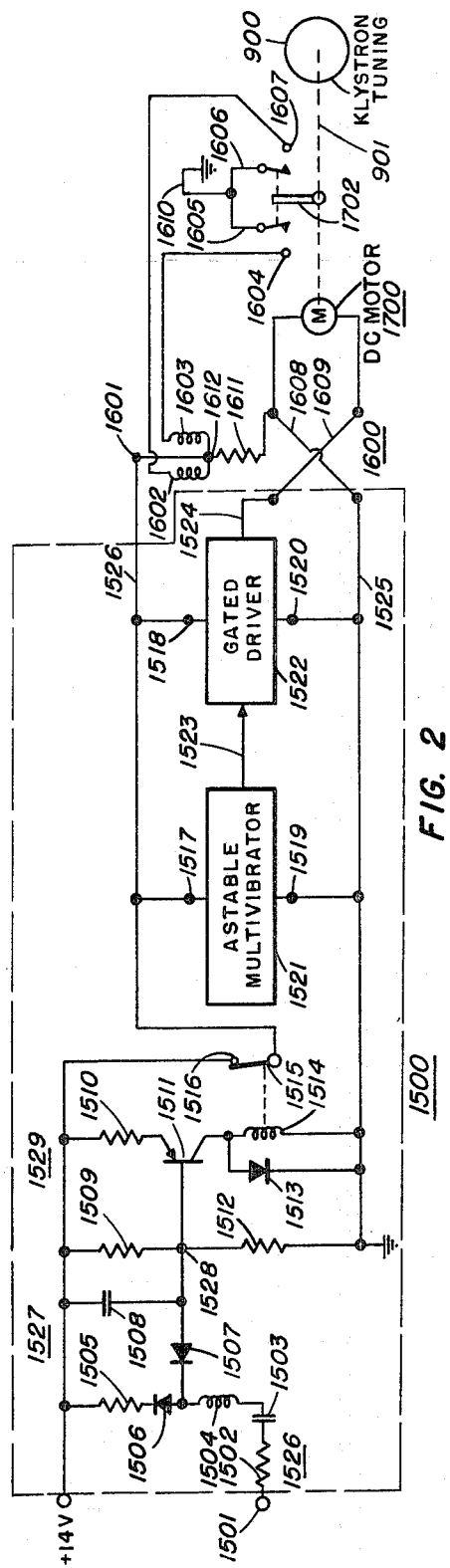
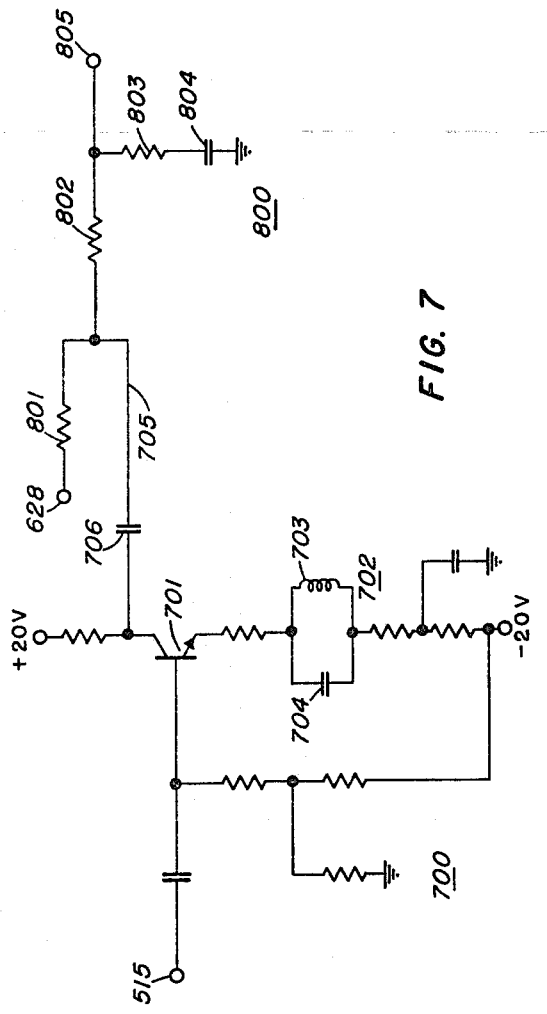
FIG. 2
FIG. 7

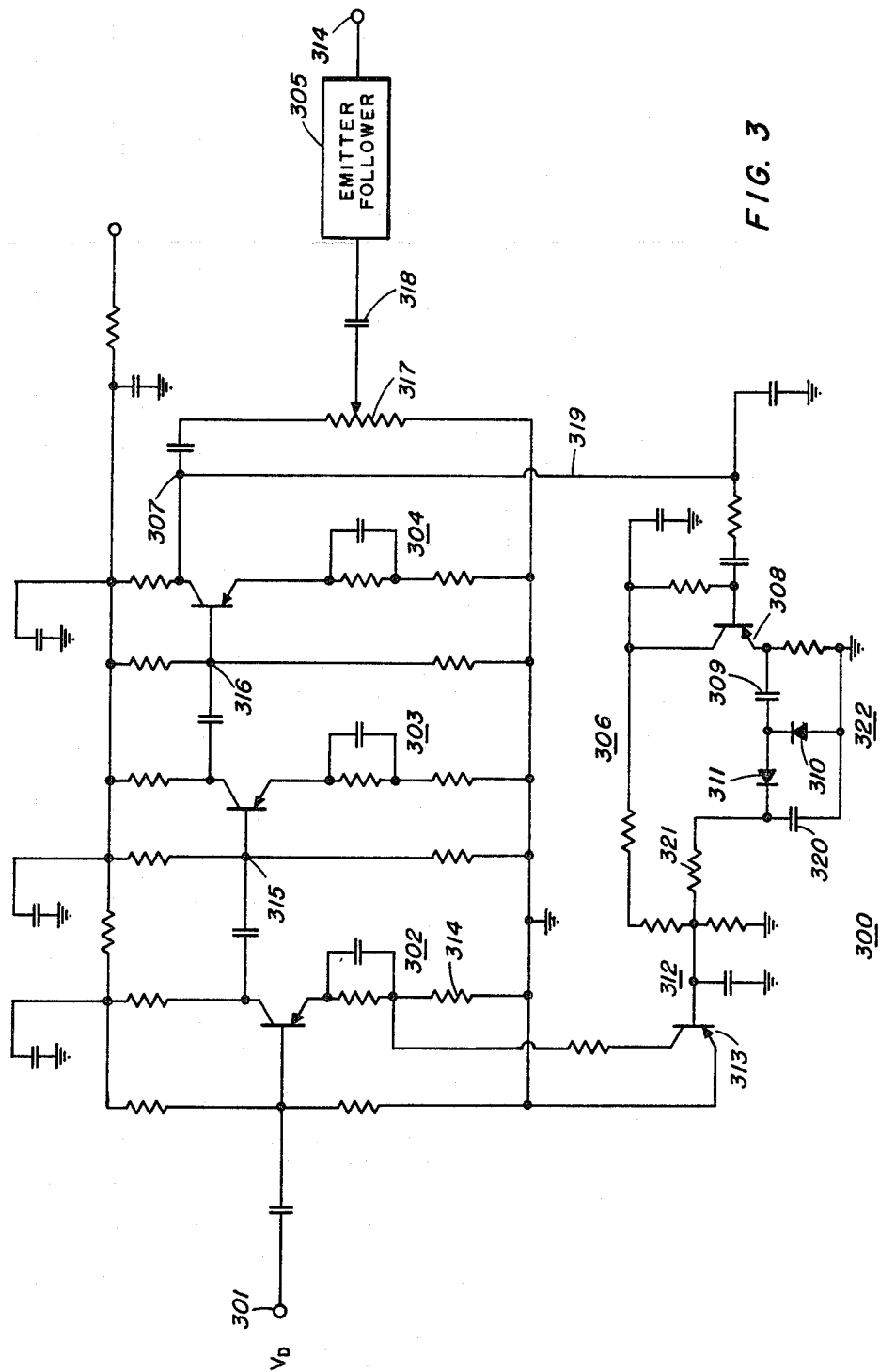

The present invention relates to a frequency control system and, more particularly, to a frequency control system employing a phase locked local oscillator and a reference oscillator to produce an output signal offset in frequency from an input signal by an amount equal to the reference frequency.

The concepts of this invention find particular utility in the simulation of a moving target for the testing of a missile equipped with search radar.

For example, previous methods of testing such missiles involved sending aloft a drone aircraft to serve as a target. The difficulty with this procedure was that a successful test resulted in the destruction of the target aircraft. Therefore, it was desirable that an inexpensive and reusable target be provided.

An artificial target must present to the missile search radar an accurately simulated real target which will, in general, be approaching or receding from the missile. A falling target having reflecting properties similar to the real target is inadequate since the missile search radar depends in part on the Doppler shift of the returned signal. The artificial target must, therefore, approach or recede from the vehicle or effectively simulate such motion.

It is an object of the present invention to provide a system which will generate a signal of a frequency slightly offset from but directly related to the frequency of an input signal.

It is also an object of the present invention to provide a moving target simulator for a radar equipped missile.

It is also an object of the present invention to provide a target simulator which is recoverable and reusable.

It is a further object of the present invention to provide a target simulator which will generate a signal giving the appearance of a Doppler shift.

The present invention accomplishes the above objects by means of a receiver responsive to an illuminator frequency and a radiating local oscillator phase locked to the receiver output. To provide apparent approach or recession, the local oscillator is offset from the illuminator frequency giving the appearance of a Doppler shift.

Figure 1:
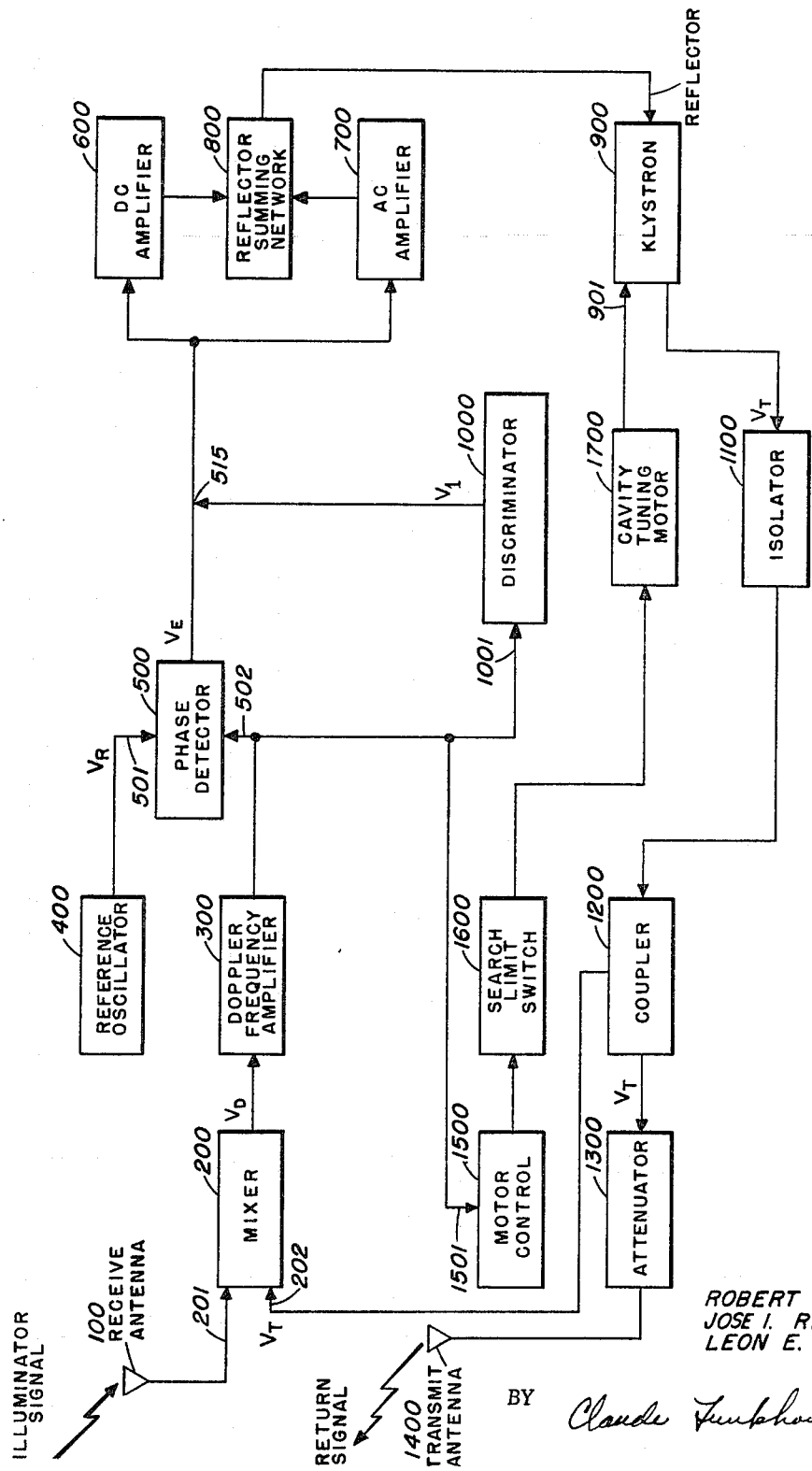
Figure 5B:
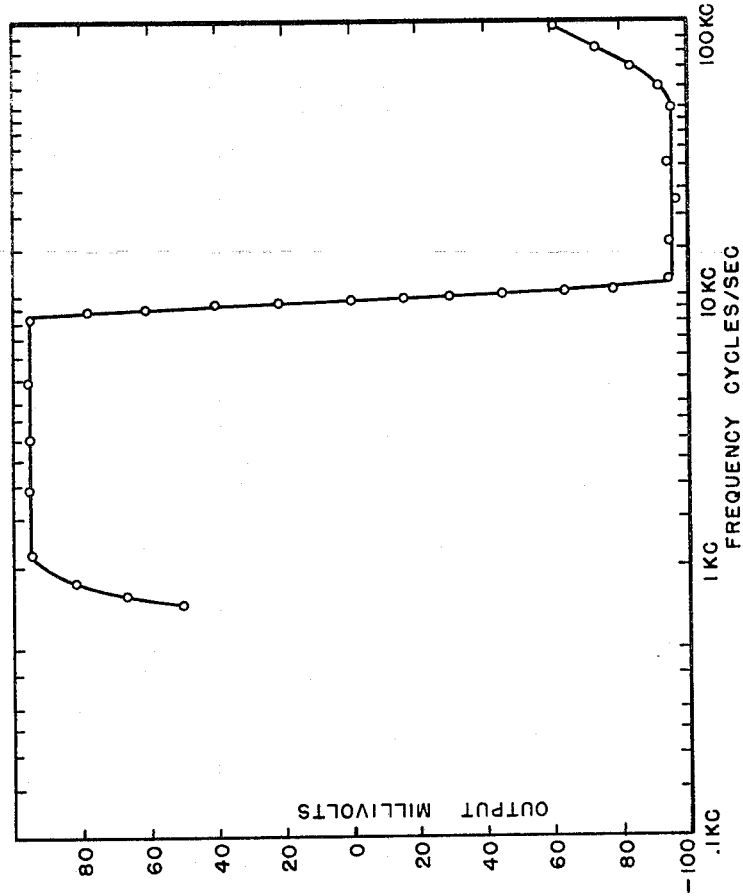
Figure 4:
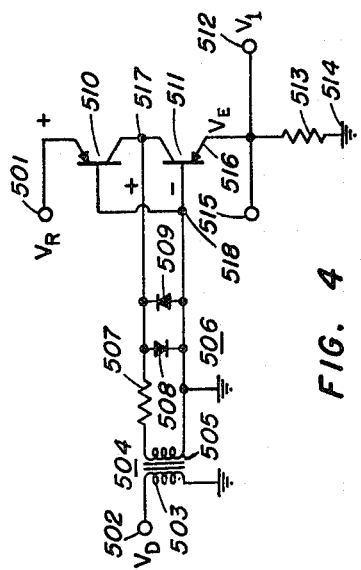
Figure 5A:
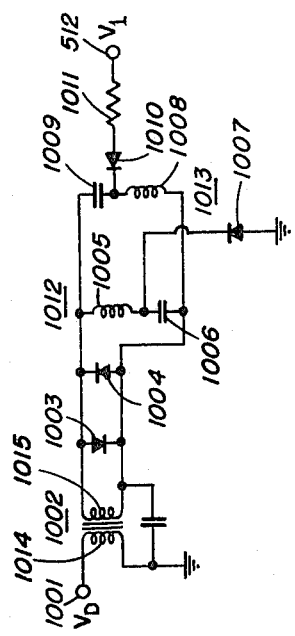
Figure 6:
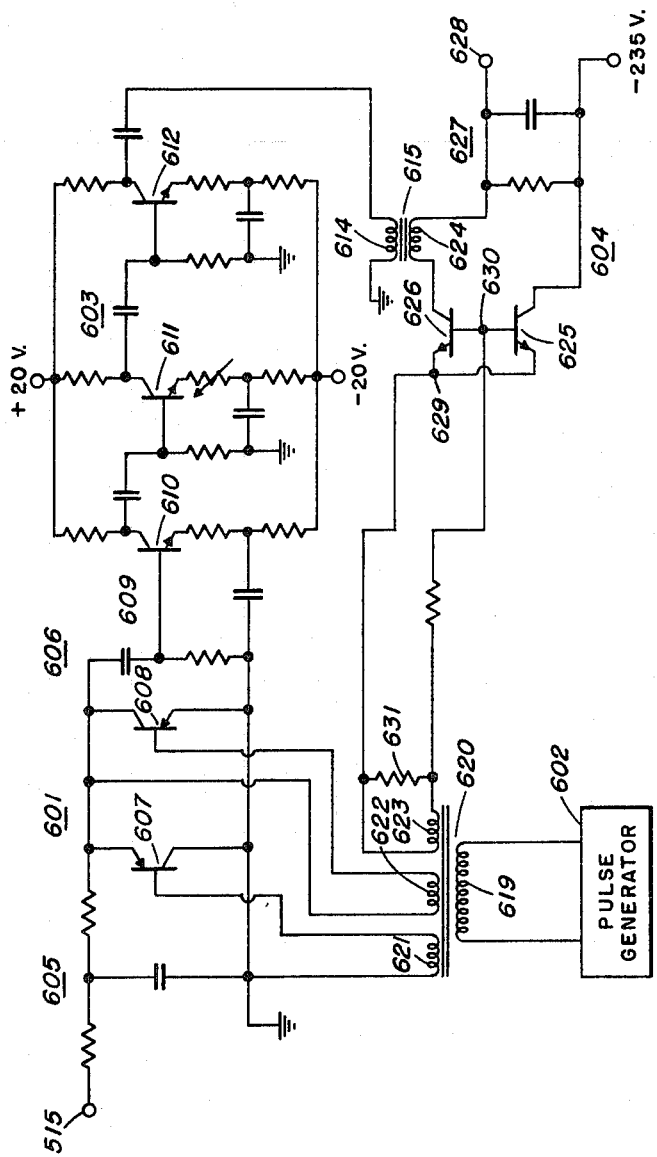

Other objects, advantages and novel features of the invention will become apparent from the following detailed description of the invention when considered in conjunction with the accompanying drawings wherein:

FIG. 1 is a block diagram of the target simulator of the present invention;
FIG. 2 shows the details of the motor control circuit;
FIG. 3 shows the Doppler frequency amplifier;
FIG. 4 shows the details of the phase detector circuit;
FIGS. 5a and 5b show the details and frequency response of the discriminator;
FIG. 6 shows the chopper type D.C. amplifier; and
FIG. 7 shows the A.C. amplifier and summing network.

FIG. 1 shows a block diagram of a suitable embodiment of the frequency control system of the present invention in the form of a Doppler target simulator. The system shown, as well as a suitable power supply, is enclosed in an aluminum canister and is parachute-dropped to test the operability and accuracy of the missile system.

As the missile approaches the falling target simulator, it sends out a radar signal of a particular frequency denoted the illuminator frequency. This illuminator signal is presented to a balanced mixer 200 at input 201 by a receiving means such as antenna 100. Mixer input 202 is provided by a signal $V_t$ generated by a local oscillator aboard the target. In a well-known manner, mixer 200 provides a signal $V_d$ whose frequency is the difference between the illuminator frequency and the signal $V_t$. In the present embodiment, this difference corresponds to the apparent Doppler shift when the system is in steady-state operation. Signal $V_d$ is then amplified by the Doppler frequency amplifier 300.

Reference oscillator 400 is a typical audio frequency oscillator and produces an output $V_r$. Its function is to fix the frequency offset or in the present case the apparent Doppler shift of the signal to be transmitted. The reference signal $V_r$ and signal $V_d$ are compared by phase detector 500 to produce an error signal $V_e$ corresponding to the frequency difference between them. Error signal $V_e$ is amplified by D.C. amplifier 600 and A.C. amplifier 700 and then impressed upon the reflector electrode of klystron 900 through reflector summing network 800 to lock the klystron to the illuminator frequency at an offset equal to the reference frequency.

Signal $V_d$ is also supplied to discriminator 1000 whose center frequency is equal to the reference frequency. The discriminator output $V_1$, a phase sensitive D.C. signal is supplied to the klystron reflector through amplifiers 600 and 700 and network 800 to assure phase lock above the illuminator frequency, i.e., an approaching target. Reversing the sense of the discriminator output would provide phase lock below the illuminator frequency, i.e., a receding target.

The klystron output $V_t$ is supplied through isolator 1100 to coupler 1200 from which a signal is fed to input 202 of the mixer 200 to close the phase locked loop. The coupler 1200 also supplies the signal $V_t$ to an output circuit such as transmission antenna 1400 through attenuator 1300.

Further control of the klystron is provided by the cavity tuning motor 1700, a limit switch 1600 and a motor control 1500.

The signal $V_d$ is supplied to motor control 1500 which includes a band pass filter and pulsing arrangement to provide pulsed operation of motor 1700 when the frequency of signal $V_d$ from the Doppler frequency amplifier 300 deviates from the reference frequency by a substantial amount. Search limit switch 1600 sets the range over which the klystron may be tuned and, since tuning is in only one direction, switch 1600 also reverses motor 1700 to reset the cavity when the upper limit is reacehd.

A number of the elements shown in the embodiment of FIG. 1 are commercially available and the circuitry of these elements is of no concern in the present invention.

For example, mixer 200 is advantageously a Bogart Coaxial Balanced Bar Hybrid with matched IN23DMR crystals. Operation is typically in the range of 5800–6000 megacycles with a VSWR of less than 1.5 to 1.

Isolator 1100 is a Cascade Research Uniline Model CN–121–A. Its characteristics are VSWR of 1.2 to 1, forward attenuation of less than 1 db and reverse attenuation of 40 db.

Attenuator 1300 is a Radar Design Corporation coaxial model RDA–1. Attenuation is determined by the cross sectional area of the target to be simulated and is set before deployment of the target.

Signal coupler 1200 is a Douglas Microwave model 148–59 20 db coupler.

Reference oscillator 400 is a Reeves-Hoffman model S1166, variable in discrete steps between 6 and 36 kc.

The local oscillator is a type VA116 reflex klystron.

Antennas 100 and 1400 are quarter-wave sleeved stubs with hemispherical-conical ground planes. Teflon radomes are provided to protect the radiating elements.

It should be understood that the elements enumerated are only exemplary and other equivalent components would also be suitable.

The unique aspects of the remaining elements of FIG. 1 are shown in FIGS. 2–7.

FIG. 2 shows a motor control 1500, a search limit switch 1600 and a tuning motor 1700 suitable for operation with the reflex klystron local oscillator of the present embodiment.

Terminal 1501 of motor control 1500 is connected to the output of the Doppler frequency amplifier 300. The frequency of the signal appearing at terminal 1501 at any given time will depend on the difference between the illuminator frequency and the klystron frequency $V_t$ at that time. Terminal 1501 is connected to a suitable series resonant circuit 1526 (FIG. 2) consisting of a resistor 1502, a capacitor 1503, and an inductor 1504. The resonant frequency is chosen to be equal to the frequency of reference oscillator 400. The resonant circuit is connected to rectifier circuit 1527, including diodes 1506 and 1507, and a filter network including a resistor 1505 and a capacitor 1508. The amplitude of the signal appearing at junction 1528 will depend on the band-width of the resonant circuit 1526; if the band-width is small, the signal will be smaller for a given deviation from the resonant frequency than it will be if the band-width is wide.

Terminal 1528 is the input to search control circuit 1529 which may include a common emitter amplifier 1511 having a relay coil 1514 in the collector circuit. Operating voltage for 1511 is supplied through resistors 1509, 1510 and 1512 and through relay coil 1514. Since circuit 1526 is series resonant, the signal amplitude at terminal 1528 will increase as the frequency of $V_d$ approaches that of reference signal $V_r$, and, therefore, the current through relay coil 1514 will also increase. The circuit is designed so that the relay current when circuit 1526 is near resonance is sufficient to pull in relay arm 1515, opening the circuit between bus 1526 and the operating voltage source at normally closed contact 1516. Therefore, it is seen that as the difference between the frequency of the signal generated by klystron 900 and the illuminator frequency approaches the frequency of reference oscillator 400, i.e., that the frequency $V_t$ corresponds to the proper Doppler shift, the operating power will be disconnected from the circuitry fed by power bus 1526. Diode 1513 protects transistor 1511 from large transients during the discharge of coil 1514.

Assuming that the frequency of $V_t$ is substantially different from the desired Doppler shift, then operating power will be provided to an astable multivibrator 1521, a gated driver 1522, and to a search limit switch 1600 through terminals 1517, 1518 and 1601, respectively.

A suitable astable multivibrator 1521 provides a pulse train at its output 1513 to gated driver 1522 which may be a transistor amplifier biased for normally cut-off operation. The output 1524 of driver 1522 is supplied through search limit switch 1600 to the field coil of cavity tuning motor 1700.

Ground return for multivibrator 1521 and driver 1522 is provided through ground bus 1525 at terminals 1519 and 1520, respectively.

Tuning motor 1700 may be of any suitable type; in the present embodiment, Globe motor type SS–98 is used.

As previously stated, power for motor 1700 is provided in the form of discrete current pulses. Such operation is advantageous since driving the motor by short pulses overcomes the problems of overshoot due to the inertia of the motor. By suitably choosing the band-width of resonant circuit 1526, motor operation may be halted before overshoot but sufficiently close to optimum position so that phase lock may be readily accomplished by control of the klystron reflector voltage.

As shown, motor 1700 is connected to the klystron 900 at 901 for the purpose of tuning the cavity. The motor 1700 and the limit switch 1600 are arranged in the present case so that each pulse causes the klystron frequency to be reduced to avoid hysteresis in the cavity tuning. Limit switch 1600 provides for a tuning range of a few megacycles on either side of the nominal illuminator frequency.

One suitable means to set these limits is shown in FIG. 2. An arm 1702 is connected to the shaft of motor 1700 and is positioned to engage either arm 1605 or 1606 when the corresponding limit of the tuning range is reached. Arms 1605 and 1606 and the respective stationary contacts 1604 and 1607 may comprise a pair of microswitches or other suitable contact means.

Both arms 1605 and 1606 are connected to ground at 1610. Contact 1604 is connected to coil 1603 and contact 1607 is connected to coil 1602 of limit switch 1600. The two coils are connected together at 1612 and to point 1601 on bus 1526. Resistor 1611 is also connected between point 1612 and one side of the field coil of motor 1700.

If arm 1702 makes contact with arm 1605, current will flow from point 1601, through coil 1603 contact 1604 and arm 1605 to ground energizing switch 1600 to one of its two positions. In a similar manner, contact between arm 1702 and arm 1606 will cause coil 1602 to be energized setting switch 1600 in its other position.

If switch 1600 is in the position shown, resistor 1611 will be connected to ground through arm 1608 and will have no affect on the operation of motor 1700. Pulses provided at output 1524 will pass through arm 1609, motor 1700 and arm 1608 to ground bus 1525 causing motor 1700 to move in discrete steps. This position of switch 1600 corresponds to the tuning mode of the motor 1700. Assuming that arm 1702 is moving toward coil 1602 in the tuning mode, operation continues in this fashion until contacts 1606 and 1607 close, indicating the lower end of the tuning range.

Upon closure of contacts 1606 and 1607, switch 1600 reverses, arm 1608 connecting terminal 1524 to the upper end of motor 1700 and arm 1609 connecting the lower end of motor 1700 to ground bus 1525. Pulses from terminal 1524 now pass through motor 1700 in the opposite direction to ground. In addition, current flows from point 1601 through resistor 1611 and motor 1700 to ground causing continuous high speed operation of motor 1700 in the reverse direction. This position of switch 1600 corresponds to the resetting mode of motor operation and continues at high speed until contacts 1604 and 1605 are closed by arm 1702 indicating the upper end of the tuning range closure of these contacts causes switch 1600 to return to its original position and to reinitate tuning operation in the pulsing mode. The above process continues as long as power is supplied through contacts 1515 and 1516, i.e., until the frequency of $V_d$ approaches the frequency of reference signal $V_r$.

FIG. 3 shows the Doppler frequency amplifier 300. The amplifier passband covers a wide frequency range such as one kilocycle per second to over 60 kilocycles per second in order to eliminate excessive phase shift in the amplifier open loop transfer characteristics.

The input to amplifier 300, signal $V_d$, is provided through input terminal 301 to a first stage amplifier 302 such as a transistor amplifier operating in the common emitter configuration. The output of amplifier 302 is connected at terminal 315 to second stage amplifier 303. The output of amplifier 303 is connected at terminal 316 to third stage amplifier 304. In the present embodiment, both stages 303 and 304 are identical in configuration to amplifier stage 302. The output of amplifier 304 is connected at terminal 307 to a level control such as potentiometer 317 and then through coupling capacitor 318 and emitter-follower 305 to output terminal 314. Terminal 307 is also connected through lead 319 and suitable coupling means to emitter-follower 308 of automatic gain control network 306. The output of emitter-follower 308 is connected through capacitor 309 to a rectifier network 322 such as diodes 310 and 311, across a filter capacitor 320 and resistor 321 to the input circuit 312 of transistor 313, the emitter-collector circuit of which is connected across resistor 314 in the emitter circuit of first stage amplifier 302.

In operation, the signal $V_d$ is amplified by stages 302, 303 and 304 and supplied to output 314. In addition, the output is sampled by the AGC circuit 306 to control the gain of stage 302. Signal fluctuations at point 307 are rectified and filtered by circuit 306 to produce a D.C. signal proportional to the input signal level. This D.C. signal is applied to the base of transistor 313 to vary its collector to emitter resistance. Therefore, it may be seen that transistor 313 is effectively a variable resistor in the emitter path of amplifier 302, serving to vary the gain thereof in response to changes in the input signal level. It should, however, be understood that other forms of automatic gain control such as a direct bias of stage 302 may also be used.

FIG. 4 is a diagram of phase detector 500. The output of Doppler frequency amplifier 300 is supplied to the phase detector at terminal 502 of an input transformer 504 including primary winding 503 and secondary winding 505. Both windings 503 and 505 are grounded at their lower ends as shown. Secondary 505 is connected through resistor 507 to a clipping network 506 such as diodes 508 and 509. Clipper 506 is provided to limit the maximum peak-to-peak amplitude of the signals supplied to the detector.

The detector circuit itself may comprise a pair of gated transistors 510 and 511, the collectors of which are connected together at terminal 517. Reference oscillator signal $V_r$ is supplied to the emitter of transistor 510 through terminal 501. The emitter 516 of transistor 511 is connected to terminals 512 and 515 and to ground at point 514 through load resistor 513.

A return path is provided for the base electrodes of transistors 510 and 511 and for clipping network 506 through lead 518 of secondary winding 505. An output signal supplied at terminal 515 comprises the sum of the phase error signal $V_e$ and $V_1$, the output of discriminator 1000 having been provided at terminal 512.

The output of phase detector 500 is a phase sensitive D.C. signal. When the input signal appearing across secondary 505 leads reference voltage $V_c$ by 90°, the output voltage across resistor 513 is zero. When the input signal leads the reference by more than 90°, the output voltage becomes negative and, when the input leads by less than 90°, the output voltage is positive; the amplitude being dependent upon the degree of departure from 90°.

Further control of the klystron frequency is provided by the use of a discriminator 1000 such as that shown in FIG. 5a.

The circuit comprises an input transformer 1002, clipping diodes 1003 and 1004, resonant circuits 1012 and 1013 and detector diodes 1007 and 1010. Diodes 1003 and 1004 are connected across the secondary 1015 and serve to limit the peak-to-peak voltage in the circuit. Resonant circuit 1012 which comprises inductor 1005 and capacitor 1009 is tuned slightly below the reference frequency. In known fashion, the voltage divider comprising resonant circuits 1012 and 1013 provides respective peak-to-peak signals at the terminals of diodes 1007 and 1010 whose amplitude is large for signal frequencies far from the resonant frequencies and approaches a null at the reference frequency.

Diodes 1007 and 1010 provide envelope detection and, in combination with resistor 1011, produce a D.C. signal proportional to the positve half of the envelope for frequencies below the reference frequency and proportional to the negative half of the envelope for frequencies above the reference frequency.

The output characteristic of the discriminator is shown by FIG. 5b in which the abscissa represents the frequency of input signal at terminal 1001 of FIG. 5a and the ordinate represents the voltage across resistor 513 of FIG. 4. The steep slope of the curve near the null point results from the closeness of the resonant frequencies of circuits 1012 and 1013 while the amplitude limiting above and below resonance is caused by conduction of shunt diodes 1003 and 1004.

The combination signal appearing at terminal 515 (FIG. 4) has both D.C. and A.C. components. In order to provide signals of suitable level for the klystron reflector, amplification over the entire frequency range is necessary. To this end are provided D.C. amplifier 600 and A.C. amplifier 700.

Chopper type D.C. amplifier 600, shown in FIG. 6, comprises a chopping stage 601, a pulse generator 602, a three stage amplifier 603, and synchronous rectifier 604.

The signal at terminal 515 passes through a suitable low pass filter 605 to remove the error signal frequency components and to avoid the generation of beat frequencies between the error frequency and the chopper signal frequency.

The filtered signal then passes to chopper 601 which may comprise gated transistors 607 and 608. Chopping or gating signals are provided to the base electrodes of transistors 607 and 608 through secondary windings 621 and 622, respectively, of transformer 620. One transistor, such as 607, is connected with its collector grounded, while the other transistor 608 is grounded at its emitter. Accordingly, pulses appearing on windings 621 and 622 allow both transistors 607 and 608 to conduct heavily providing complementary gated shunt paths. Chopper 601 acts as a sampling switch, the sampling intervals being the periods during which transistors 607 and 608 are non-conducting.

The sampled signals are supplied through a suitable coupling circuit 606 to input 609 of a multi-stage audio frequency amplifier 603 of any suitable type.

As is well-known, by sampling the input D.C. signal at some convenient audio rate, the amplifier design requirements, particularly with regard to low frequency gain and drift, are minimized. In the present embodiment, multi-stage RC coupled amplifier including transistors 610, 611 and 612 is used, although any equivalent circuit would be acceptable.

To recover the amplified D.C. signal, the output of amplifier 603 is connected through transformer 615 to synchronous rectifier 604 including gated transistors 625 and 626. The synchronizing signals all supplied between junctions 629 and 630 by winding 623 in phase with the gating signals for chopper 601. The emitter electrodes of transistors 625 and 626 are coupled at point 629 and the base electrodes are coupled at point 630 providing a control and return path through winding 623 and resistor 631. During the sampling periods, both transistors 625 and 626 are rendered conductive so that signals of either polarity induced in secondary 624 will provide a signal across a suitable hold network 627. An amplified D.C. signal is therefore available at terminal 628.

Chopping and synchronizing signals may be provided by any suitable pulse generator 602 such as an astable multivibrator. The output of pulse generator 602 is connected to primary winding 619 of transformer 620 to provide the gating pulses for the chopper 601 and rectifier 604.

The output of the D.C. amplifier 600 is connected to the reflector summing network 800. In addition, the network 800 is supplied an amplified form of the A.C. component of the combination signal appearing at terminal 515.

FIG. 7 shows the A.C. amplifier 700 and reflector summing network 800. A.C. amplifier 700 comprises a conventional single stage transistor 701 and, as in the case of the D.C. amplifier, the input is supplied by the combination signal appearing at terminal 515. The emitter of transistor 701 is connected to a tuned trap circuit 702, comprising capacitor 704 and inductor 703, to attenuate the reference oscillator frequency before it reaches the reflector summing network.

FIG. 7 also shows the reflector summing network 800. The values of the resistors 802 and 803 and of capacitor 804 are chosen to provide the proper tracking rate for the phase locked loop in view of various constraints imposed by the remainder of the system. For example, the klystron sensitivity, the available D.C. amplifier gain, the allowable klystron drift and the allowable tracking error will, in part, determine the time constants and, therefore, the value of the resistance and capacitance of network 800. While they are not to be construed as limiting the present invention, the following exemplary values are given:

| | |
|---|---|
| Resistor 802, ohms | 390K |
| Resistor 802, ohms | 150K |
| Resistor 803, ohms | 210 |
| Capacitor 804, mfds | 0.29 |

It should be noted that the output of the A.C. amplifier 705 is supplied through capacitor 706 to resistor 802. The input from the D.C. amplifier is supplied at terminal 628 and is integrated by resistor 801 and capacitor 706. Terminal 805 is connected to the klystron reflector electrode to control the frequency of the local oscillator.

Obviously many modifications and variations of the present invention are possible in the light of the above teachings. It is therefore to be understood that within the scope of the appended claims the invention may be practiced otherwise than as specifically described.

What is claimed is:
1. A frequency control system comprising:
   means for receiving a variable frequency input signal;
   means to generate an output signal differing in frequency from the input signal by a predetermined amount;
   a fixed frequency signal source; and
   control means connected to the generating means, the receiving means, and the fixed frequency signal source, responsive to changes in the input or output frequency, to control the generating means to maintain a frequency difference between the input and output signals equal to the fixed frequency.

2. A frequency control system of claim 1 in which the control means includes:
   mixing means connected to the receiving means and the generating means to provide a difference signal of a frequency equal to the difference between the input and output signal frequencies;
   discriminating means connecting the mixing means and the fixed frequency signal source to provide a phase control signal;
   detecting means connected to the mixing means to provide a frequency control signal; and
   means connecting the detecting means and the discriminating means to the generating means to provide frequency control and phase lock between the input and output signals.

3. A frequency control system comprising:
   a variable frequency input means;
   a fixed frequency reference source;
   a controlled oscillator providing a variable frequency output signal;
   generating means connected to the input means and to the controlled oscillator to generate a control signal having a frequency equal to the difference between the input and output frequencies; and
   means connected to the generating means, the reference source and the controlled oscillator responsive to the control signal and the fixed frequency to vary the controlled oscillator frequency until the control signal frequency is equal to the fixed frequency.

4. A frequency control system in which an output signal is generated at the frequency offset from an input frequency by a predetermined amount comprising:
   a variable frequency input means;
   a variable frequency output source;
   a fixed frequency reference source;
   mixing means connected to the input and output sources to generate a difference signal whose frequency is equal to the difference between the input and output signal frequencies;
   control means connected to the mixing means and the reference source to generate a control signal representative of the phase and frequency differences between the reference signal and the difference signal; and
   means connected to the control means and the output source to vary the output frequency to provide phase and frequency lock between the input and output signals.

5. A frequency control means comprising:
   a control signal source;
   a sensitive circuit connected to the control signal source responsive to control signals within a predetermined frequency range;
   a controlled oscillator;
   pulse responsive control means connected to the controlled oscillator to vary the frequency of oscillation;
   a pulse generator connected to the pulse responsive control means;
   a power source;
   switching means connecting the power source to the pulse generator;
   switch control means connected to the sensitive circuit and the switch means to open the switch means and remove power from the pulse generator when the sensitive circuit responds to the predetermined frequency range;
   whereby the oscillator frequency is varied in steps if the frequency of the control signal source does not lie within the predetermined frequency range.

6. The frequency control means of claim 5 in which the control signal source includes:
   means to receive an input signal; and
   means connected to the receiving means and to the output of the control oscillator to produce a control signal whose frequency is equal to the difference between the input signal frequency and the output frequency.

7. The frequency control means of claim 5 in which the pulse responsive control means includes:
   a controller connected to the oscillator;
   limit means connected to the controller to indicate controller settings corresponding to upper and lower oscillator frequency limits; and
   reversal means connected to the limit means and the controller responsive to each frequency limit being reached to cause the controller to vary the frequency of the oscillator toward the other frequency limit.

8. The frequency control means of claim 7 further including:
   means connected to the reversal means to maintain step variation of the oscillator frequency from one limit to the other but to cause continuous variation during the return to the first limit.

9. The frequency control means of claims 8 in which the control signal source includes:
   means to receive an input signal; and
   a mixer connected to the receiving means and to the output of the oscillator to indicate the frequency difference between the input and the output signals.

10. The frequency control means of claim 9 in which the oscillator is a reflex klystron having cavity tuning means connected to the controller.

11. A target simulator for a moving target radar system comprising:
   means to receive a signal transmitted by the radar system;
   means to generate an output signal representative of a predetermined Doppler shift of a simulated moving target, the generating means including:
   a variable frequency local oscillator;
   mixing means connected to the receiving means and the local oscillator to generate a Doppler signal having a frequency equal to the difference between the frequencies of the received signal and the oscillator output signal;
   a reference frequency generator;
   control means connected to the reference frequency generator, the mixing means and the local oscillator to vary the frequency of the local oscillator in a predetermined manner until the Doppler signal frequency is equal to the reference frequency; and
   further means connected to the local oscillator to transmit the output signal to the radar system.

12. The target simulator of claim 11 in which the control means includes means connected to the local oscillator to control the phase of the output signal in a predetermined manner.

13. The target simulator of claim 11 in which the control means comprises:
   detecting means connected to the reference frequency generator and the mixing means to produce a first signal representative of the phase difference between the Doppler signal and the reference signal;
   discriminating means connected to the mixing means to produce a second signal representative of the frequency difference between the reference signal and the Doppler signal;
   means connecting the detecting means and the discriminating means to the local oscillator to vary the frequency of the output signal to achieve phase and frequency lock with the incoming radar signal.

14. The target simulator of claim 13 further including coarse control means connecting the mixing means and the local oscillator to vary the frequency of the output signal until the Doppler signal frequency approaches the reference frequency.

15. A target simulator for a Doppler radar system comprising:
   means to receive an input signal from the radar system;
   a kylstron local oscillator including cavity tuning means and reflector electrode means;
   mixing means connected to the klystron and to the receiving means to generate a Doppler signal indicating the difference between the input frequency and the klystron output frequency;
   a gain controlled amplifier connected to the mixing means;
   a reference oscillator;
   phase detector means connected to the gain controlled amplifier and the reference oscillator to generate a phase error signal indicating the phase difference between the Doppler signal and the reference signal;
   discriminator means connected to the gain controlled amplifier to generate a control signal indicative of the frequency difference between the Doppler signal and the reference signal;
   control amplifier means connected to the phase detector means and the discriminator means;
   a reflector control network connected between the control amplifier means and the klystron reflector electrode to vary the reflector bias to provide phase and frequency lock between the klystron output signal and the input signal at a frequency offset equal to the reference frequency; and
   means connected to the klystron to transmit the output signal to the radar system.

16. The target simulator of claim 15 in which the control amplifier means includes a low frequency amplifier comprising:
   frequency conversion means to increase the frequency of the input signal;
   higher frequency amplifying means connected to the conversion means to amplify the converted input signal; and
   means connected to the higher frequency amplifying means to recover an amplified version of the input signal; and
   a high frequency amplfying means to amplify signals of frequencies beyond the range of the low frequency amplifier.

17. The target simulator of claim 16 in which the reflector control network includes:
   means connected to the low frequency amplifier to integrate the low frequency signal; and
   means connecting the integrating means and the high frequency amplifying means to the klystron reflector electrode.

18. The target simulator of claim 15 further including a klystron tuning control connected between the gain controlled amplifier and the cavity tuning means responsive to frequency variations in the Doppler signal to tune the klystron cavity in a predetermined manner.

19. The radar simulator of claim 18 in which the tuning control comprises:
   a selective circuit connected to the gain controlled amplifier;
   switching means connected to the selective circuit and operative to its open state upon activation of the selective circuit;
   a source of power connected to one end of the switching means;
   a pulse generator connected to the other end of the switching means;
   whereby power is supplied to the pulse generator only upon deactivation of the selective circuit;
   drive means connected to the cavity tuning means; and
   means connecting the pulse generating means to the drive means to vary the klystron frequency in steps when the pulse generator is operating.

20. The target simulator of claim 19 in which the connecting means comprises:
   limit control means connected to the drive means to set the range over which the klystron cavity may be tuned; and
   reversing means connecting the limit control means and the drive means to reverse the direction of the drive means when either limit is reached.

21. The target simulator of claim 20 in which the reversing means include means connected to the pulse generator end of the switching means to supply continuous power to the drive means to return the drive means to one of its limits when the other of its limits is reached.

No references cited.

CHESTER L. JUSTUS, *Primary Examiner.*

R. E. KLEIN, R. D. BENNETT, *Assistant Examiners.*